United States Patent [19]
Kato et al.

[11] Patent Number: 5,876,298
[45] Date of Patent: Mar. 2, 1999

[54] SPEED REDUCTION DEVICE HAVING OVERRUNNING CLUTCH

[75] Inventors: Akira Kato, Anjo; Takahiro Souki, Handa; Masaru Kamiya, Nagoya, all of Japan

[73] Assignee: Denso Corporation, Kariya, Japan

[21] Appl. No.: 884,632

[22] Filed: Jun. 27, 1997

[30] Foreign Application Priority Data

Jul. 10, 1996 [JP] Japan ................................ 8-180806

[51] Int. Cl.⁶ ................................................. H02K 16/00
[52] U.S. Cl. ........................ 475/162; 475/168; 475/178
[58] Field of Search .................................. 475/162, 168, 475/176, 177, 178, 156, 157

[56] References Cited

U.S. PATENT DOCUMENTS

| | | | |
|---|---|---|---|
| 4,177,695 | 12/1979 | Grove | 475/178 X |
| 4,561,833 | 12/1985 | Minegishi | 475/168 X |
| 5,286,237 | 2/1994 | Minegishi | 475/178 |
| 5,292,289 | 3/1994 | Ogata et al. | 475/176 |
| 5,433,672 | 7/1995 | Tanaka et al. | 475/178 |
| 5,471,890 | 12/1995 | Shiga et al. | 74/7 E |
| 5,498,215 | 3/1996 | Hosokawa et al. | 475/162 |
| 5,528,945 | 6/1996 | Okada | 74/7 E X |
| 5,609,539 | 3/1997 | Herstek et al. | 475/168 |
| 5,643,128 | 7/1997 | Kennedy | 475/168 |
| 5,695,425 | 12/1997 | Hashimoto et al. | 475/168 X |

FOREIGN PATENT DOCUMENTS 60 34761  3/1985  Japan .

*Primary Examiner*—Dirk Wright
*Assistant Examiner*—Peter T. Kwon
*Attorney, Agent, or Firm*—Pillsbury Madison & Sutro LLP

[57] ABSTRACT

A speed reduction device including an overrunning clutch has a drive shaft having an eccentric ring and an inner gear plate disposed to be rotatable relative to the eccentric ring. The gear plate has a plurality of teeth and engagement holes. The device further has fixing pins fixed to the housing in engagement with the engagement holes of the inner gear plate to restrict rotation of the inner gear plate to thereby allow swinging of the gear plate, an outer ring disposed around the inner gear plate and connected to a driven shaft and a torque transmitting member which engages the teeth of the inner gear plate to transmit torque from the inner gear plate to the outer ring. The torque transmitting member is arranged to disengage the teeth of the inner gear plate by centrifugal force when the outer ring rotates at a speed higher than a threshold value.

21 Claims, 14 Drawing Sheets

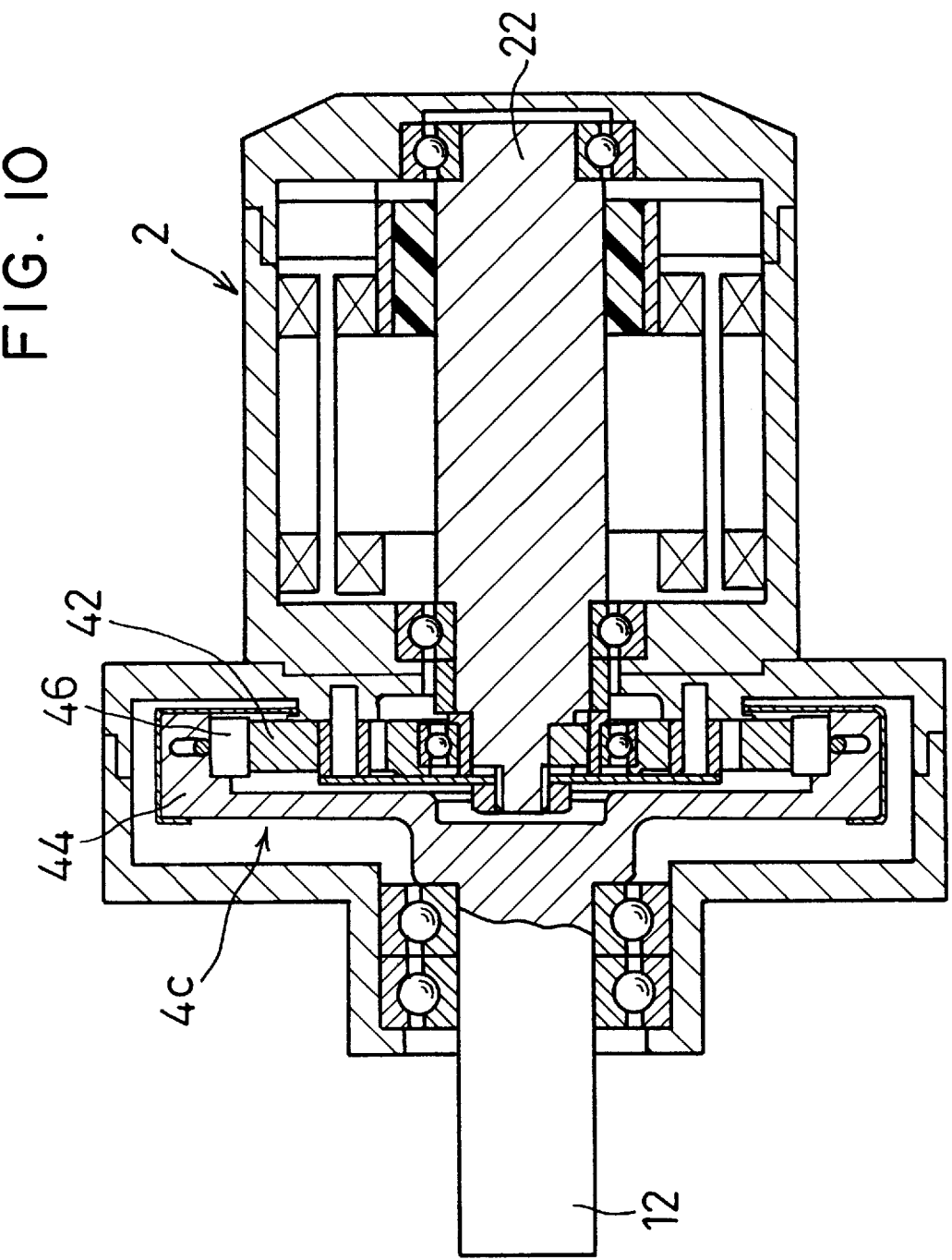

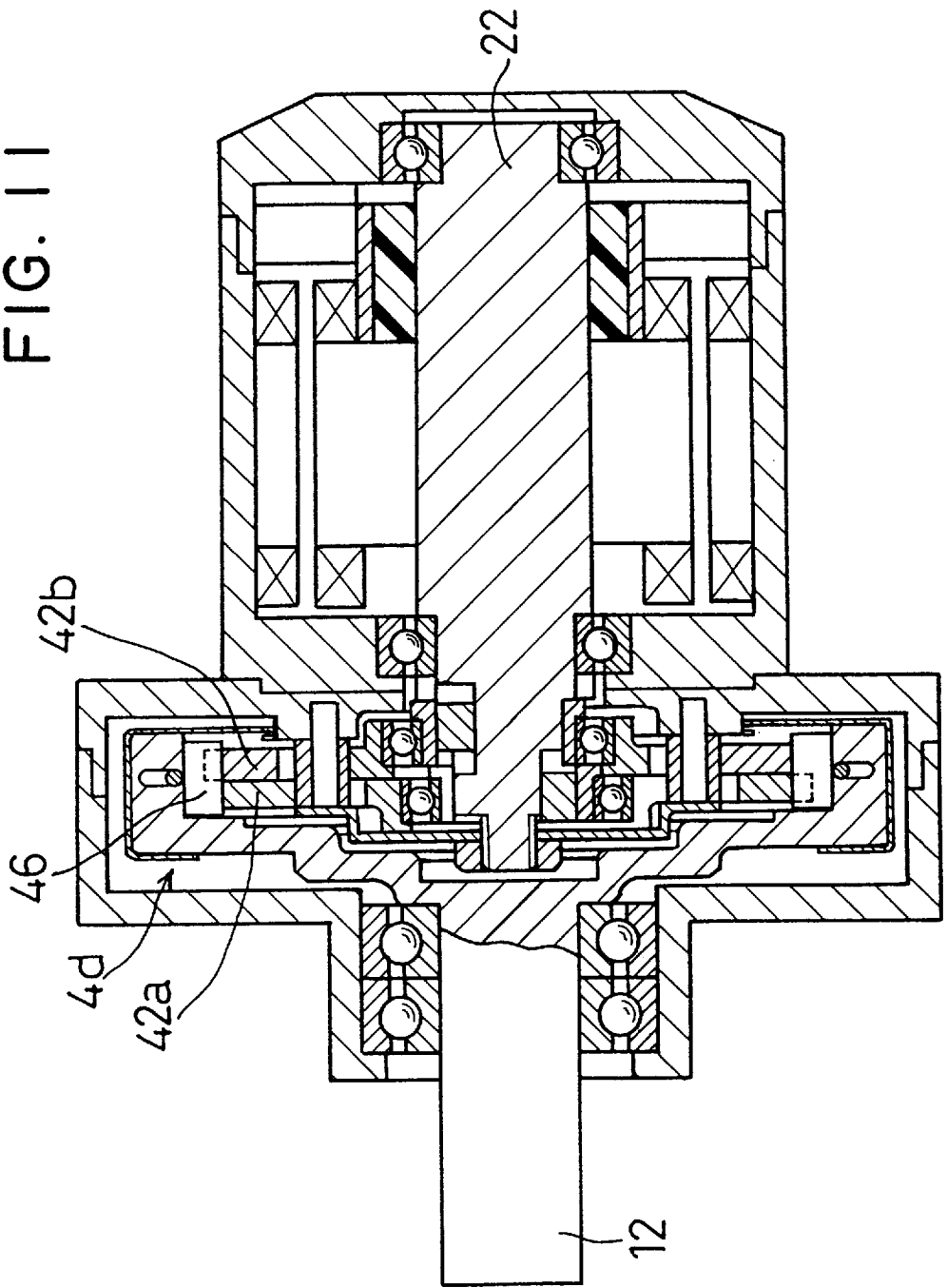

SPEED REDUCTION DEVICE HAVING OVERRUNNING CLUTCH

BACKGROUND OF THE INVENTION

1. Field of the Invention

The present invention relates to a speed reduction device having an overrunning clutch and, particularly, a vehicular rotary machine which has a starting motor or a starter-generator.

2. Description of the Related Art

A common starter motor for a vehicle has an overrunning clutch disposed between the pinion shaft and the driving shaft of the motor to prevent over-run of the starter motor when an engine starts and the starter motor is driven by the engine. A speed reduction device is sometimes employed in the starter motor to reduce the size of the starter motor and also to increase the engine starting torque. For this purpose, an eccentric-gear speed-reduction device, which is composed of a drive shaft having an eccentric ring and an internal gear in mesh with the eccentric gear and provides a large speed reduction ratio has been proposed.

The above-described starter motor, however, needs a complicated structure to combine a shaft, bearings, the starter motor, the overrunning clutch and the speed reduction device, resulting in a bulky rotary machine.

SUMMARY OF THE INVENTION

The present invention has an object of providing a simple speed reduction device which makes a rotary machine compact.

Another object of the invention is to provide a simple speed reduction device integral with an overrunning clutch having a large speed reduction ratio.

According to the present invention, a speed reduction device comprises an overrunning clutch, a drive shaft having an eccentric ring, an inner gear plate disposed to be rotatable relative to the eccentric ring. The gear plate has a plurality of teeth therearound and an engagement hole. The device further has a fixing pin fixed to the housing in engagement with the engagement hole of the inner gear plate to restrict rotation of the inner gear plate to thereby allow swinging of the gear plate, an outer ring disposed around the inner gear plate and connected to a driven shaft and a torque transmitting member which engages one of the teeth of the inner gear plate to transmit torque from the inner gear plate to the outer ring. The torque transmitting member is arranged to disengage the teeth of the inner gear plate by centrifugal force when the outer ring rotates at a speed higher than a threshold value.

The torque transmitting member is preferably arranged to separate from the inner gear plate completely by centrifugal force when the outer ring rotates higher than a threshold value.

The torque transmitting member preferably comprises an outer pin in engagement with at least one of the teeth of the inner gear plate in response to swinging operation of the inner gear plate, and the outer ring has a torque transmitting portion for holding the outer pin to be in engagement with one of the teeth of the inner gear plate and a torque interrupting portion for holding the outer pin to be separate from the teeth.

The speed reduction device may additionally have means for biasing the outer pin to one of the teeth of the inner gear plate. Each of the teeth preferably has epitrochoidal-parallel-curved outer periphery. The torque transmitting portion of the outer ring preferably has a larger radius than outside radius of the outer pin, and the torque interrupting portion of the outer ring preferably has a larger radius than outside radius of the outer pin. The means for biasing may be a garter spring or a coil spring. The outer pin may comprise a soft magnetic member, and the means for biasing may comprise a magnetic field generating means.

The speed reduction device may comprise an overrunning clutch, a housing, a drive shaft having an eccentric ring disposed eccentrically therearound; a driven shaft, an inner gear plate disposed to be rotatable relative to the eccentric ring. The gear plate has a plurality of teeth therearound and a plurality of engagement holes. The speed reduction device further comprises a plurality of fixing pins, each of which is fixed to the housing in engagement with one of the engagement holes of the inner gear plate, to restrict rotation of the inner gear plate to thereby allow swinging of the gear plate, an outer ring disposed around the inner gear plate and connected to the driven shaft and a torque transmitting member to engage the teeth of the inner gear plate and transmit torque from the inner gear plate to the outer ring. The torque transmitting member is arranged to disengage the teeth of the inner gear plate by centrifugal force when the outer ring rotates at a speed higher than a threshold value.

The speed reduction device having an overrunning clutch may comprise a housing, a drive shaft having a pair of eccentric rings axially disposed eccentrically therearound, a driven shaft supported rotatably by the housing, a pair of inner gear plates disposed to be rotatable relative to the eccentric ring. Each of the inner gear plates has a plurality of teeth therearound and a plurality of engagement holes, and each one of the teeth of one of the inner gear plates is disposed between adjacent teeth of the other inner gear plate. The speed reduction device further comprises a plurality of fixing pins which are fixed to the housing in engagement with the engagement holes of the inner gear plates respectively to restrict rotation of the inner gear plates and allow swinging of the gear plates, an outer ring disposed around the inner gear plates and connected to the driven shaft and a torque transmitting member which is disposed on the inner surface of the outer ring to engage the teeth of the inner gear plates to transmit torque from the inner gear plates to the outer ring. The torque transmitting member is arranged to disengage the teeth of the inner gear plates by centrifugal force when the outer ring rotates at a speed higher than a threshold value.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIG. 10 is a cross-sectional side view illustrating a starter for a vehicle according to a fourth embodiment;

FIG. 11 is a cross-sectional side view illustrating a starter for a vehicle according to a fifth embodiment;

Figure 1:
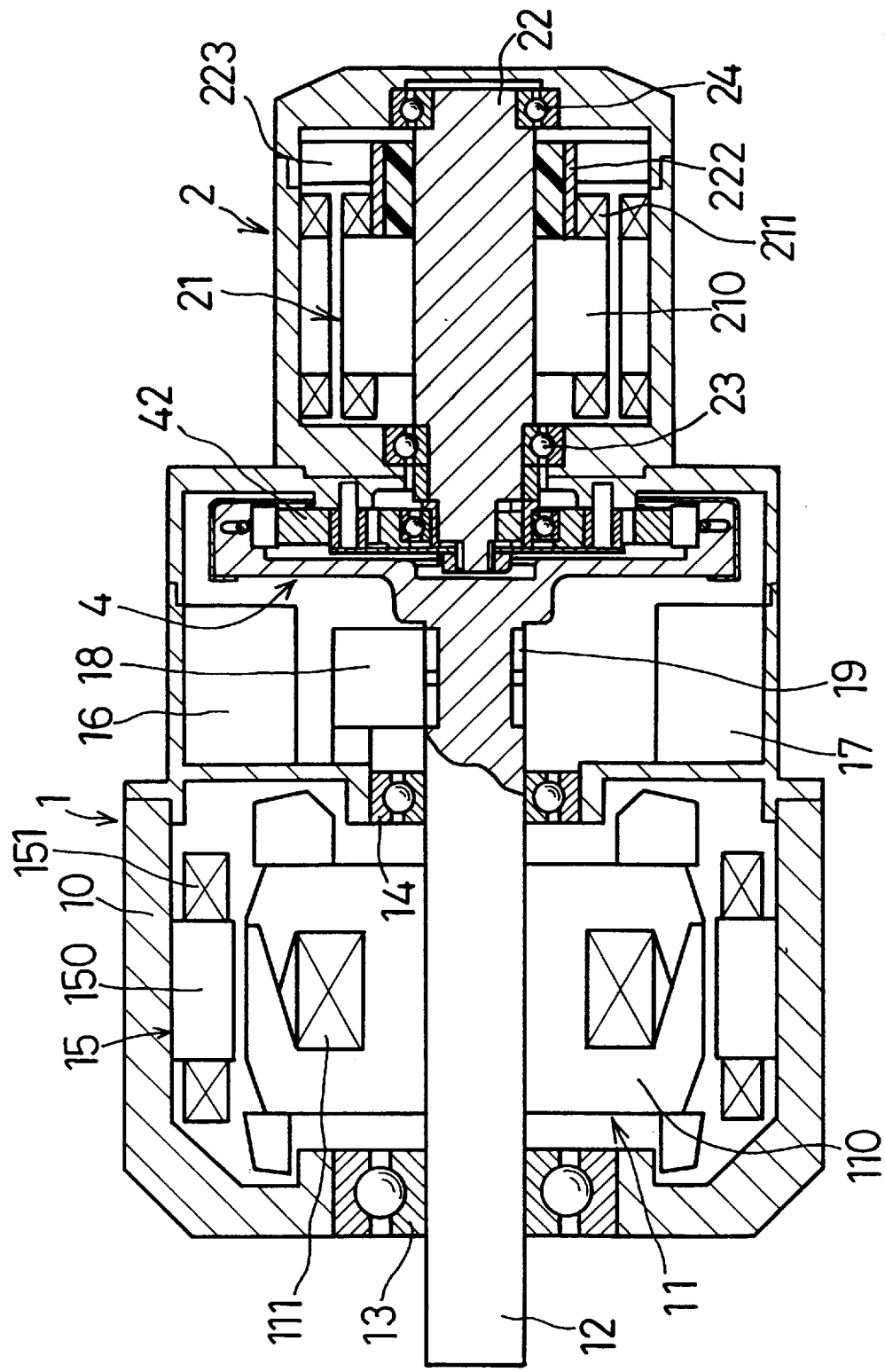
FIG. 1 is a schematic cross-sectional side view illustrating a starter generator for a vehicle according to a first embodiment of the present invention.

DETAILED DESCRIPTION OF THE PREFERRED EMBODIMENTS (First Embodiment)

A speed reduction device applied to a starter-generator according to a first embodiment of the present invention is described with reference to FIGS. 1 to 5.

The starter-generator is composed of a generator section 1, a starter motor section 2, a speed reduction section 4 having an eccentric gear mechanism (hereinafter referred to as the eccentric gear section) and a housing 10.

The generator section 1 is a common AC generator or an aternator for a vehicle, the housing 10 supports a rotor 11 and a generator shaft 12 via bearings 13 and 14. The rotor 11 has a pole core 110 and a field coil 111 wound around the central portion of the pole core 110. The stator 15 is disposed around the rotor 11 and is composed of an armature core 150 fixed to the inner periphery of the housing 10 and an armature winding 151. A voltage regulator 16, a three-phase full-wave rectifier 17 are disposed in the housing 10, and a slip ring unit 19 is fixed to the generator shaft 12. The brush unit 18 supplies field current to the field coil 111 through the slip ring unit 19. The front end (left end in FIG. 1) of the generator shaft 12 is connected to the crank shaft of an engine.(not shown).

The starter motor section 2 is a common DC starter motor and is composed of an armature 21 carried by a starter shaft 22 and a pair of bearings 23 and 24, through which the armature 21 is supported by the housing 10. The starter shaft 22 is disposed in tandem and in alignment with the generator shaft 12. The armature 21 is composed of an armature core 210 carried by the starter shaft 22, an armature winding 211 wound therearound and an annular commutator 222 carried by a resinous member fixed to the starter shaft 22. A stator 25 is composed of a pole core 250 which is fixed to the inner periphery of the housing 10 and a field coil 251 wound around the pole core 250. A brush unit 223 is fixed to the housing 10, and the armature winding 211 is supplied with current through the brush unit 223 and the commutator 222.

Figure 2:
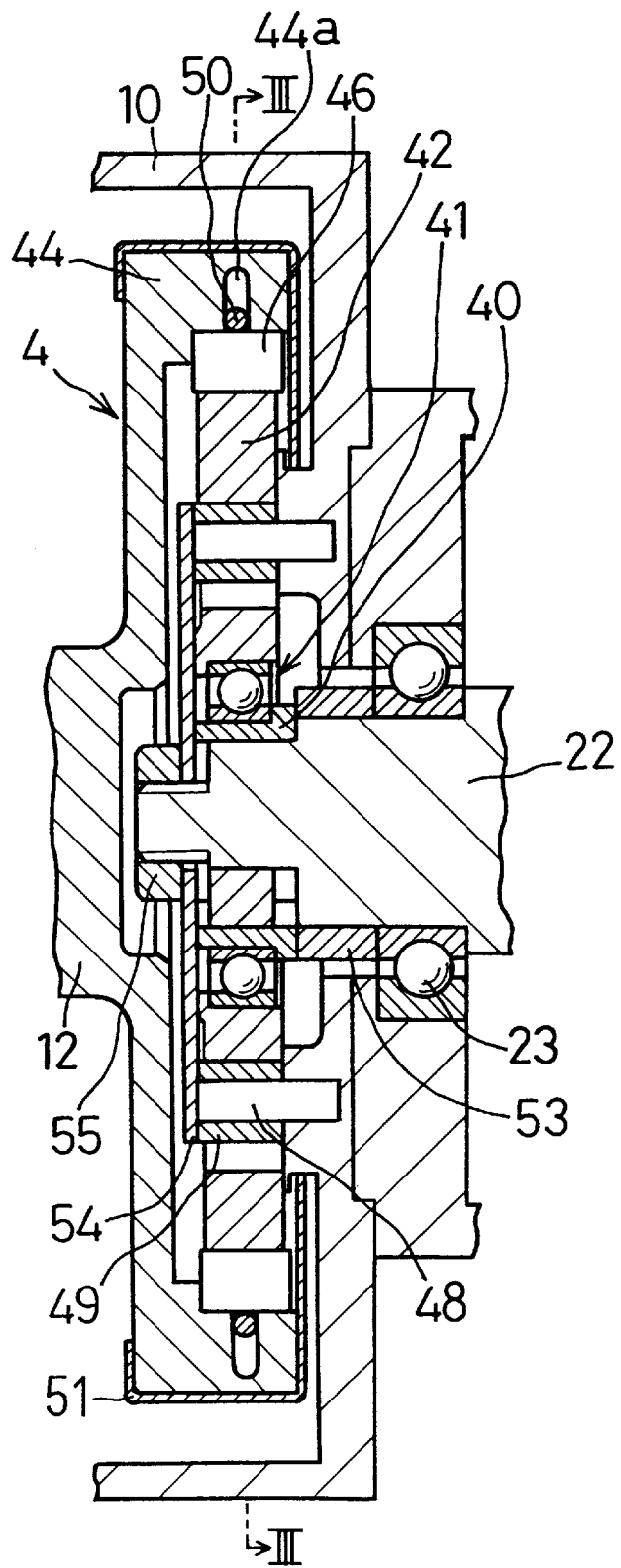
FIG. 2 is an enlarged view illustrating a main portion of the starter generator shown in FIG. 1.
Figure 3:
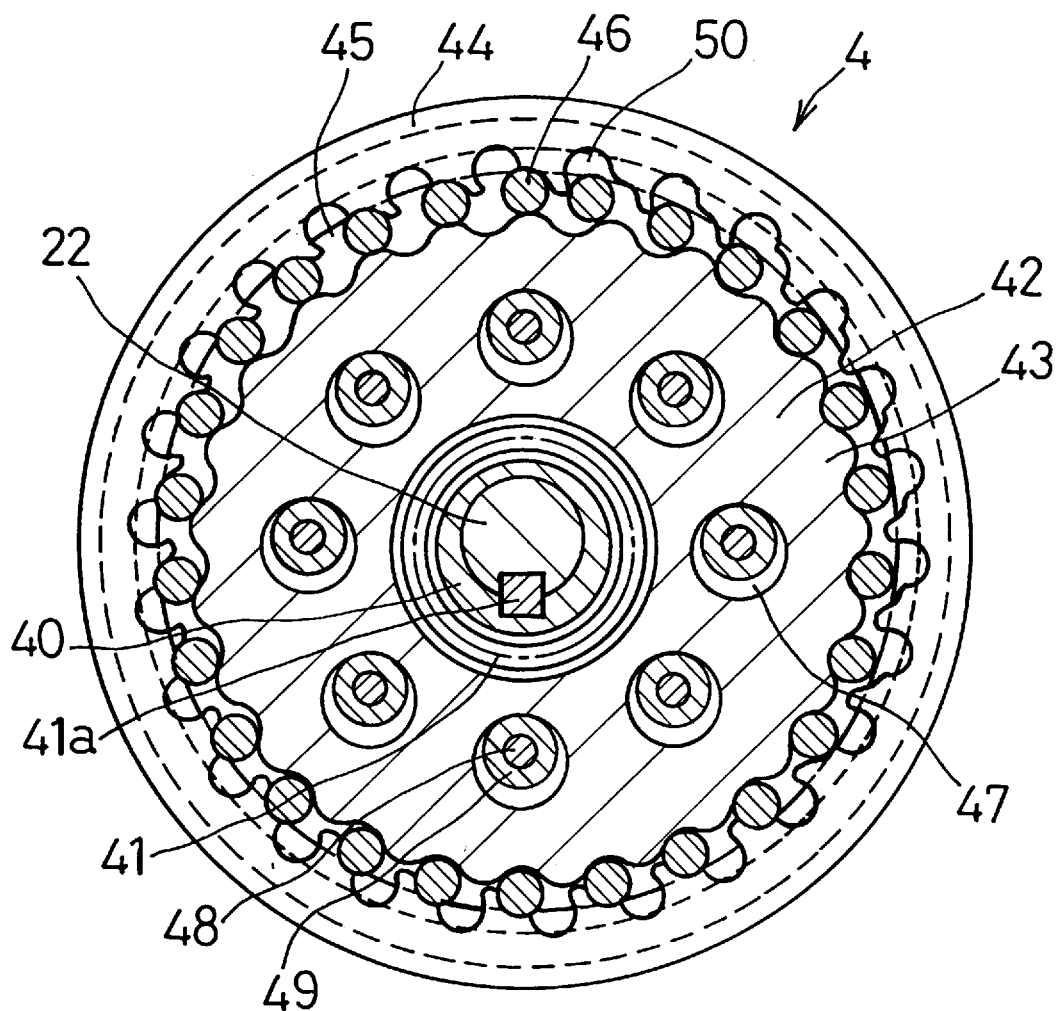
FIG. 3 is a cross-sectional front view of a portion shown in FIG. 2 cut along a line III—III.

The eccentric gear section 4 is described with reference to FIGS. 2 and 3.

An eccentric ring 40 is fixed to the front end of the starter shaft 22 by a key 41a so that the axis thereof is eccentric to the axis of the shaft 22, and an inner gear plate 42 is fitted to a bearing 41, which is fitted to the outer periphery of the eccentric ring 40 coaxially therewith so that the inner gear plate 42 can rotate about the eccentric ring 40. Gear teeth 43 are formed on the outer periphery of the inner gear plate 42, and an outer ring 44 is disposed coaxially with the inner gear plate 42 to surround the same at a certain distance. The outer ring 44 is formed integrally with the rear end (right end in FIG. 2) of the generator shaft 12. The outer ring 44 has a plurality of cavities 45 formed circumferentially on the inner periphery thereof at equal intervals to accommodate a plurality of cylindrical outer pins 46 one by one so as to move and rotate therein. For this purpose, the cavities 45 are formed on the inner periphery of the outer ring 44 coaxial with the starter shaft 22. The number (e.g. 26) of cavities 45 or outer pins 46 is one less than the number (e.g. 25) of the teeth 43 of the inner gear plate 42 in FIG. 3.

Figure 5:
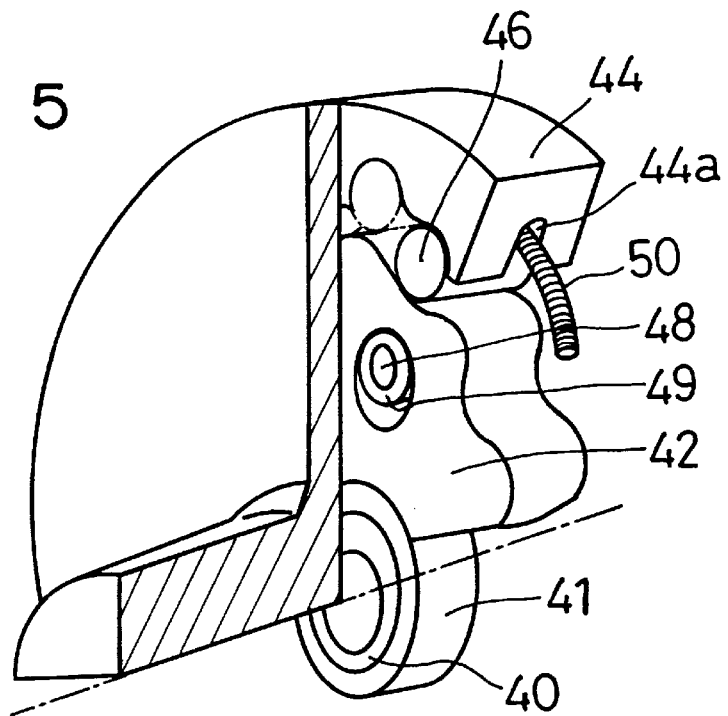
FIG. 5 is a perspective and partially cross-sectional view illustrating a main portion shown in FIG. 2.

The profile of the teeth 43 of the inner gear plate 42 is shaped into an epitrochoidal-parallel curve, which is a curve parallel to a epitrochoidal curve and forms an inner envelope of a circle of the teeth having the center thereof located on the epitrochoidal curve. The profile of the teeth 43 can be shaped into an involute curve. The inner gear plate 42 has eight through holes 47 formed at equal intervals (at 45 degree intervals) on a circumference which is coaxial with gear plate 42, so that each of the through holes 47 movably receives an end of one of fixing pins 48 covered with one of bushes 49 extending from the housing 10. The other end of each of the fixing pins 48 is press-fitted to the housing 10 so that the pins 48 are disposed at a circumference which is coaxial with the axis of the starter shaft 22 to allow the eccentric motion of the inner gear plate 42. An outer periphery of each of the bushes 49 is in contact with the corresponding one of the through holes 47. The outer ring 44 has an annular groove 44a formed in the inner periphery thereof to accommodate an annular garter spring 50 therein as shown in FIG. 5, which biases all the outer pins 46 radially inward.

Figure 4A:
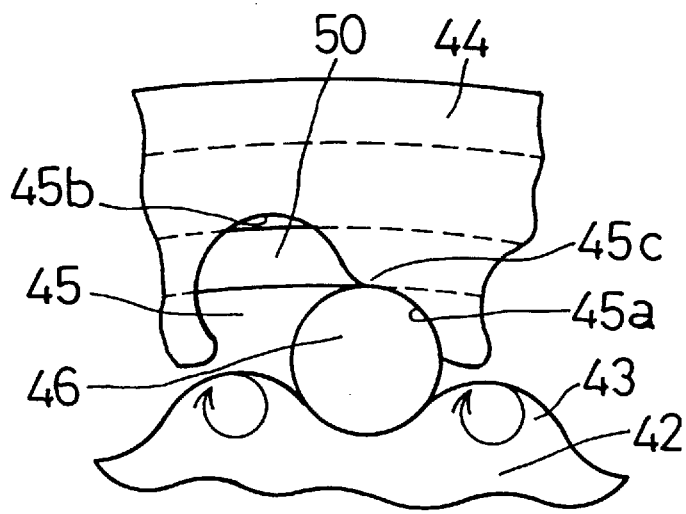
FIGS. 4A, 4B and 4C are schematic views illustrating operation of an outer pin respectively.
Figure 4B:
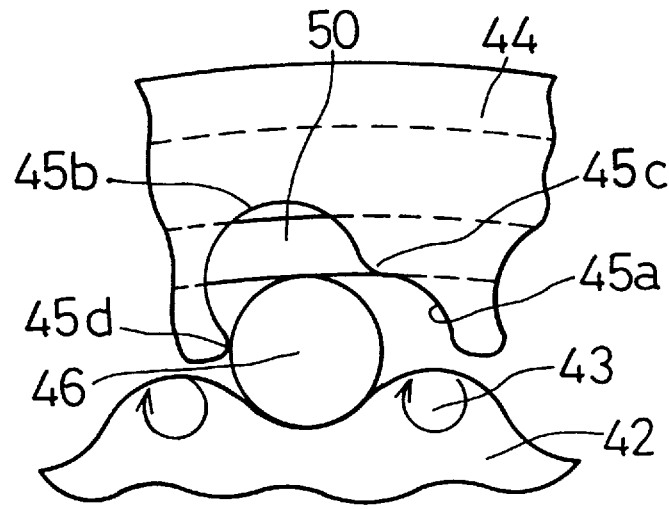
Figure 4C:
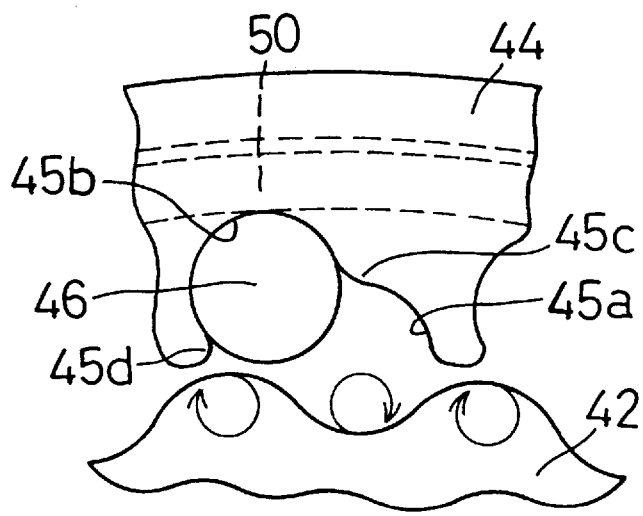

The cavities 45 has a torque transmitting portion 45a, a torque interrupting portion 45b and a boundary portion 45c as shown in FIGS. 4A, 4B and 4C. Each of the torque transmitting portion 45a and torque interrupting portion 4b has a cylindrical surface having the same inside diameter as the outside diameter of the outer pin 46 so as to be in close surface-contact with the outer pin 46 as shown in FIGS. 4A and 4C. The torque interrupting portion 45b is located to be adjacent to the torque transmitting portion 45a at a rear side in the rotating direction (e.g. left in FIG. 4A) and radially outside the outer ring 44. The boundary portion 45c is formed between the torque transmitting portion 45a and the torque interrupting portion 45b. The boundary portion 45c has a suitable height and continuous curvature to allow smooth movement of the outer pin 46 between the two portions 45a and 45b. For this purpose, the cavities 45 are filled with grease and a cover 51 is disposed to cover the outer circumference of the outer ring 44 as shown in FIG. 2.

The cylindrical surfaces of the torque transmitting portion 45a and the torque interrupting portion 45b can be formed larger or smaller than the diameter of the outer pin 46 as according to various circumstances. For example, larger interrupting portions 45b provide more smooth movement of the outer pins 46 to the transmitting portions 45a.

The eccentric gear section 4 is assembled as follows.

The bearing 23 and a cylindrical spacer 53 are fitted to the starter shaft 22, and the eccentric ring 40, the bearing 41 and the inner gear plate 42 are fitted successively. The fixing pins 48 with the bushes 49 thereon are thereafter press-fitted to the housing 10. Subsequently, a guide disk 54 is fitted to the front end (left in FIG. 2) of the starter shaft 22 and fastened thereto by a nut 55 so that the spacer 53 and the guide disk 54 restrict axial movement of the eccentric ring 40. The inner gear plate 42 is positioned between the guide disk 54 and the housing 10 at small clearances.

When the starter motor section 2 is energized and the starter shaft 22 rotates, the eccentric ring 40 is rotated to swing the inner gear plate 42 in cooperation with the fixing pins 48, which restrict rotation of the inner gear 42. When the starter shaft 22 makes one revolution clockwise in FIG. 2, the inner gear plate 42 swings eccentrically one time so that the outer pins 46 are driven by the teeth of the inner gear plate 42 clockwise. Accordingly, the outer ring 44 rotates clockwise by an interval between the adjacent cavities 45. In this embodiment, a combination of the twenty five (25) teeth of inner gear plate 42 and the twenty six (26) outer pins provides the speed reduction ratio of 1/26.

When an engine starts and the engine rotation speed becomes higher, the outer ring 44 is rotated clockwise. When the rotation speed of the outer ring 44 becomes higher than the swing speed of the teeth 43 of the inner gear 42, the outer pin 46 is brought into contact with an edge 45d of the torque interrupting portion 45b as shown in FIG. 4B. Then, the outer pin 46 gets on one of the teeth 43, lifts up the garter spring 50 and gets deeper in the interrupting portion 45b, thereby disengaging from the teeth 43. As a result, the outer ring 44 runs idle around the inner gear plate 42, and the torque from the starter shaft 22 is not transmitted to the generator shaft 12.

If the engine speed increases further and becomes higher than a set speed, the centrifugal force applied to the outer pins 46 becomes stronger than the biasing force of the garter spring 50, and the outer pins 46 overwhelm the garter spring 50 and always remain in the torque interrupting portions 45b as shown in FIG. 4C, thereby separating the outer ring 44 from the inner gear plate 42. The set speed is higher than the engine starting speed and lower than the engine idling speed. Thus, when the engine starts, the outer pins 46 are separated from the inner gear plate 42 completely so that only the generator section 1 operates as a normal generator.

(Second Embodiment)

Figure 8:
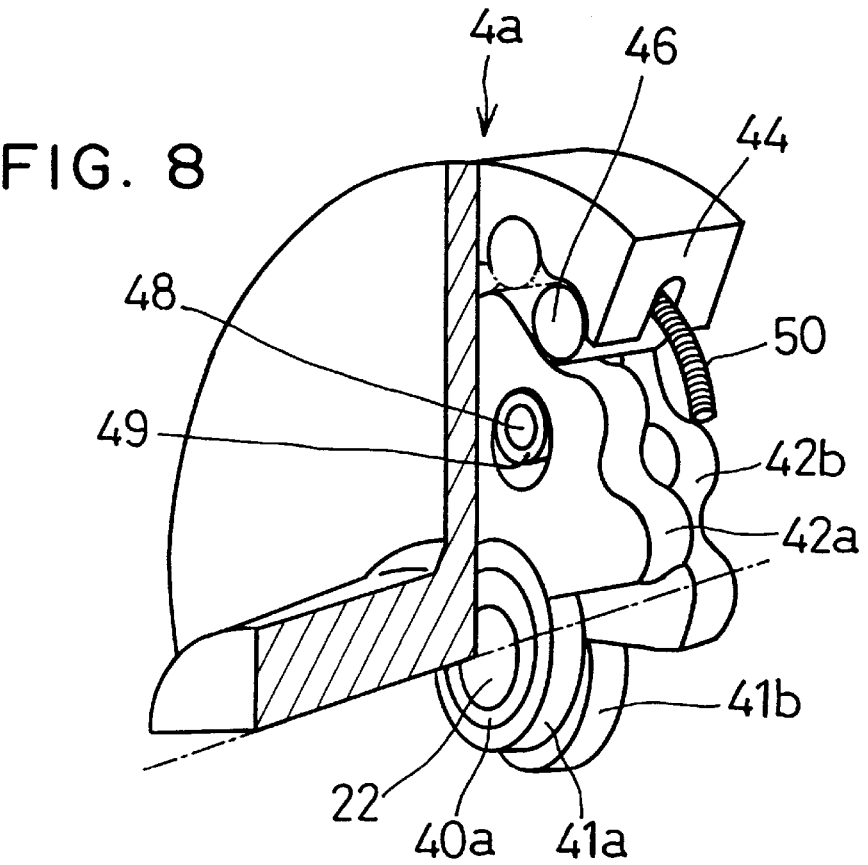
FIG. 8 is a perspective and partially cross-sectional view illustrating a main portion shown in FIG. 6.
Figure 6:
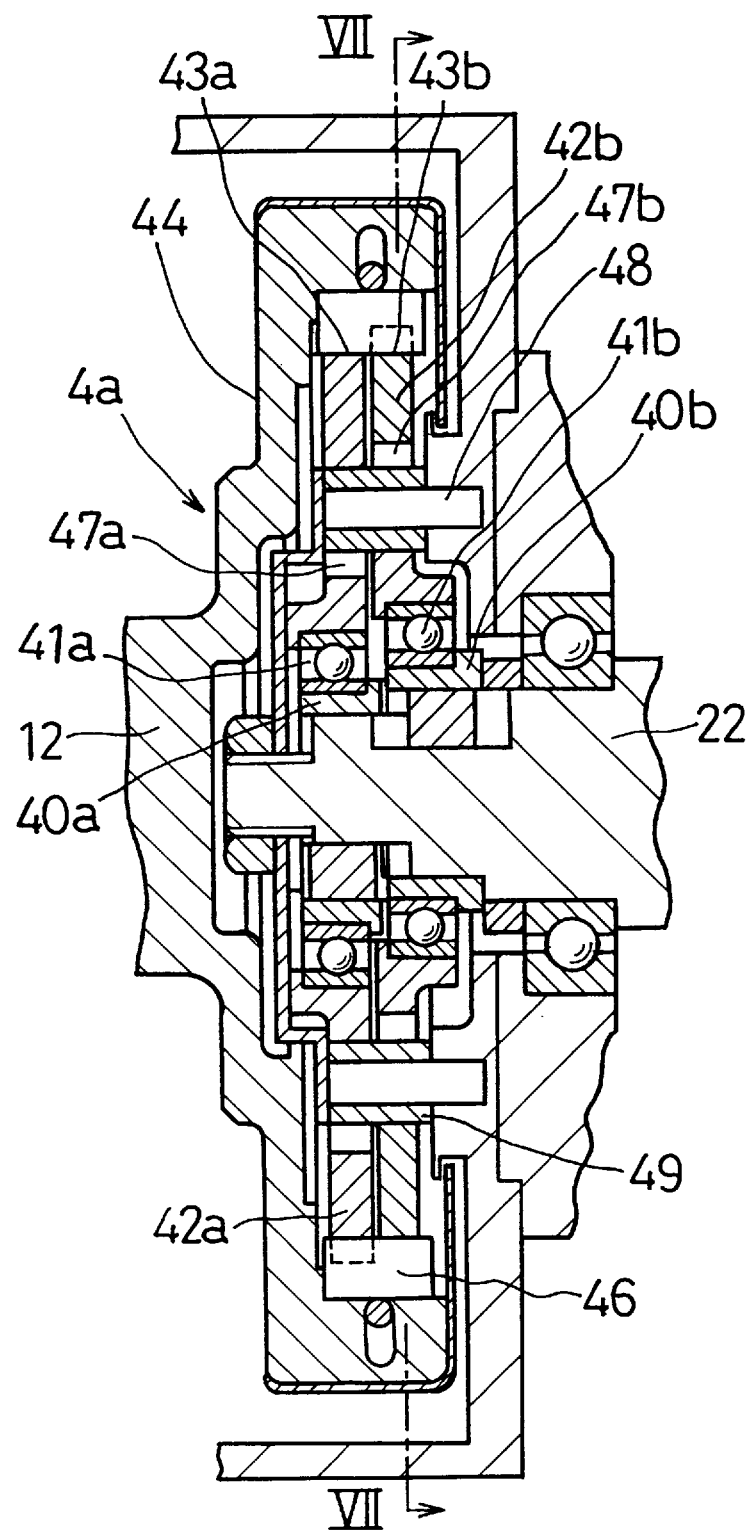
FIG. 6 is an enlarged view illustrating a main portion of a starter generator according to a second embodiment.
Figure 7:
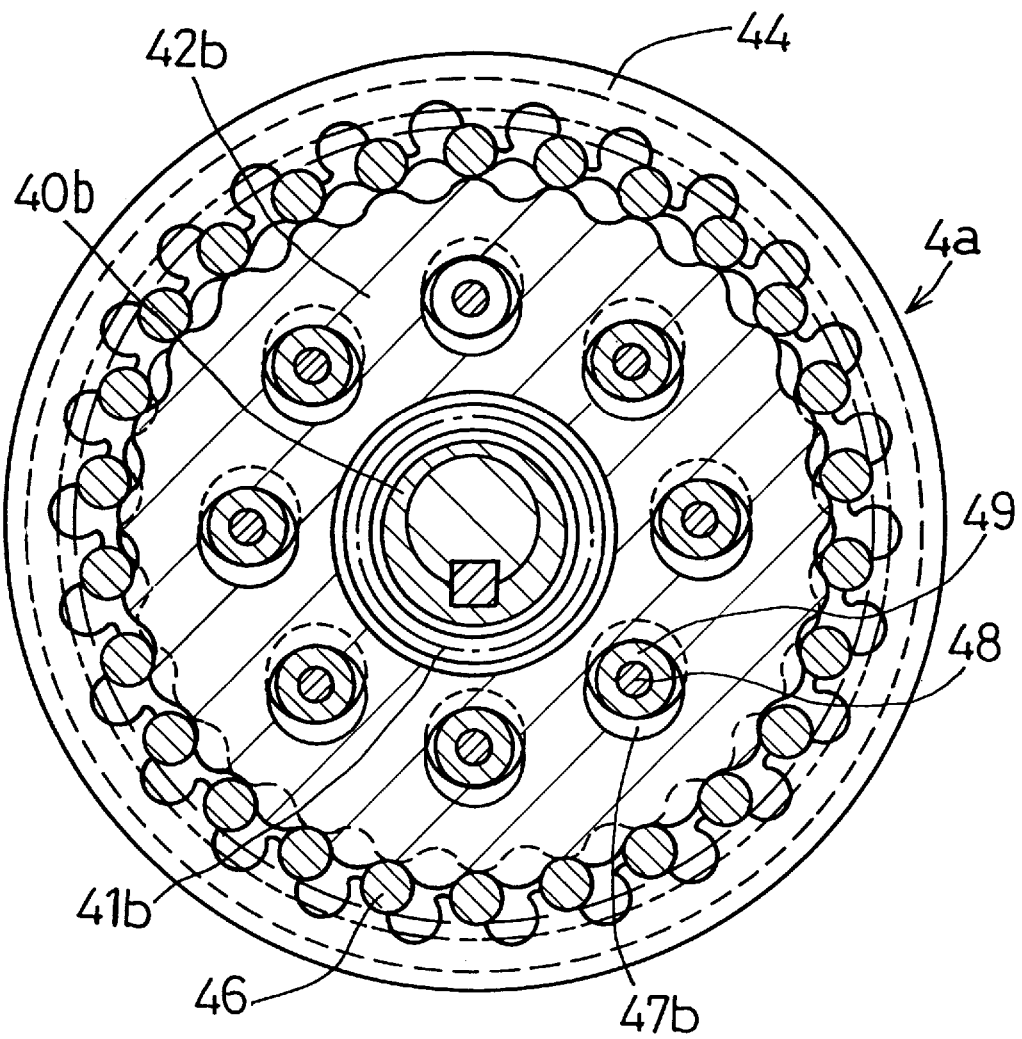
FIG. 7 is a cross-sectional front view illustrating a portion shown in FIG. 6 cut along a line VII—VII.

A starter generator according to a second embodiment of the present invention is described with reference to FIGS. 6–8.

The eccentric gear section 4 of the first embodiment is only replaced with an eccentric gear section 4a in this embodiment.

The eccentric gear section 4a is composed of a pair of first and second inner gear plates 42a and 42b, each of which is disposed to swing independently. The first inner gear plate 42a is fitted to the starter shaft 22 through a first eccentric ring 40a and a bearing 41a, and the second inner gear plate 42b is fitted to the starter shaft 22 through a second eccentric ring 40b and a bearing 41b. The first and second inner gear plates 42a and 42b have, respectively, through holes 47a and 47b similar to those of the first embodiment which receive jointly the fixing pins 48, so that the rotation of the gear plates 42a and 42b is restricted by the fixing pins 48. The first and second inner gear plates 42a and 42b have teeth 43a and 43b respectively, which are in mesh with the outer pins 46 respectively. The eccentric rings 40a and 40b are disposed to be eccentric to opposite directions (180 degree in angle). As a result, each of the outer pins 46 is pushed by either one of the teeth 43a and 43b against the outer ring 44, so that the operation of the outer pins 46 becomes smoother than the operation of the same in the first embodiment, thereby decreasing torque fluctuation, vibration and noises. Because the angular position of the center of the torque transmitted from the first inner gear plate 42a to the outer ring 44 and the angular position of the center of the torque transmitted from the second inner gear plate 42b to the outer ring 44 are located to be opposite with regard to the axis of the starter shaft 22, the outer ring 44 operates smoothly without unbalance force.

(Third Embodiment)

Figure 9:
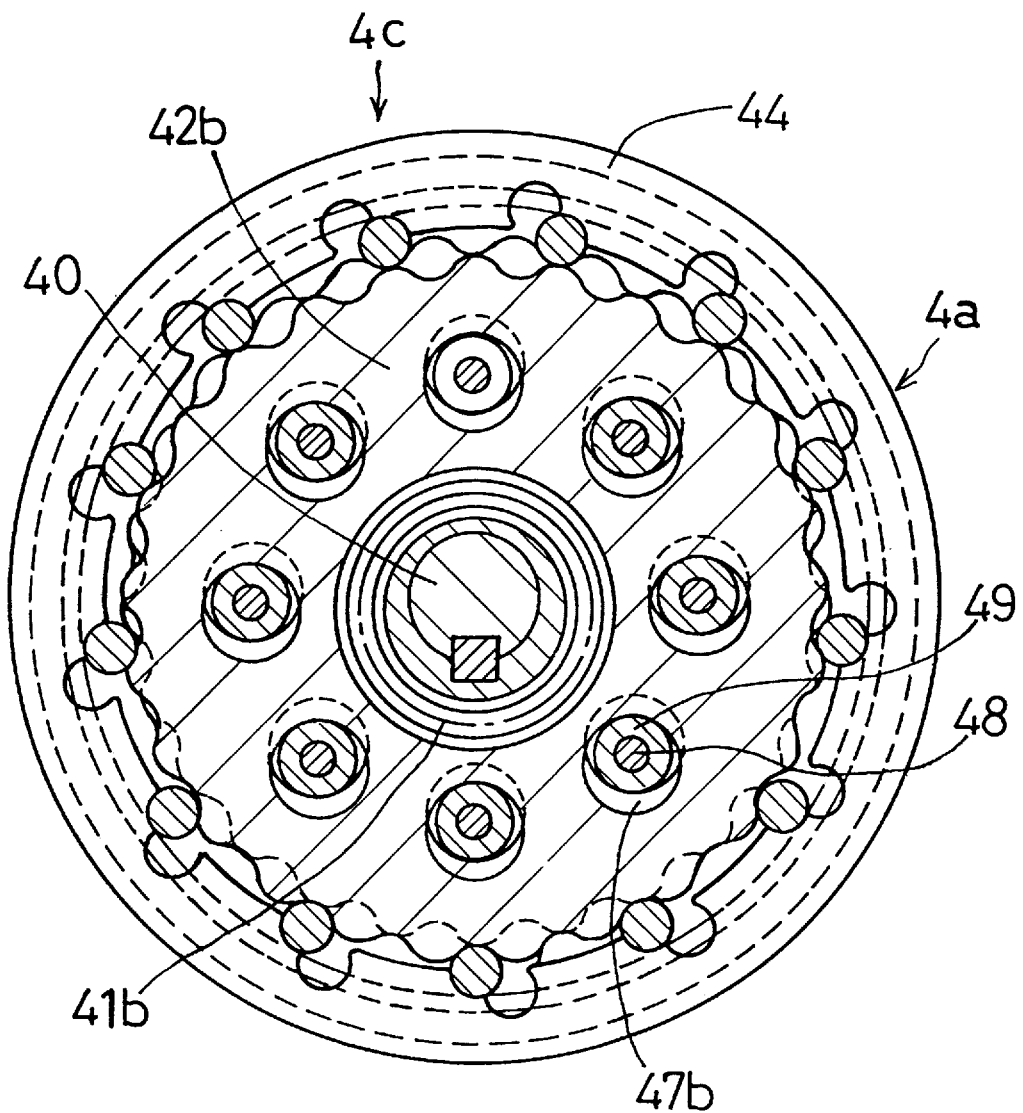
FIG. 9 is a cross-sectional front view illustrating a main portion of a speed reduction section according to a third embodiment.

A starter generator according to a third embodiment is described with reference to FIG. 9.

Only the eccentric gear section 4a of the second embodiment is replaced with an eccentric gear section 4c in this embodiment.

The eccentric gear section 4c of this embodiment has a half as many outer pins 46 and cavities 45 as the eccentric gear section of the second embodiment, thereby making the gear section simpler.

(Fourth Embodiment)

A starter according to a fourth embodiment is described with reference to FIG. 10. In this embodiment, the generator section 1 of the first embodiment is omitted. The shaft 12 is connected to the engine crank shaft through a torque transmitting means (e.g. pulleys and a belt).

(Fifth Embodiment)

A starter with an eccentric gear section according to a fifth embodiment is described with reference to FIG. 11. In this embodiment, the generator section 1 of the second embodiment is omitted, and the shaft 12 is connected to the engine crank shaft through a torque transmitting means (e.g. pulleys and a belt).

(Sixth Embodiment)

Figure 12A:
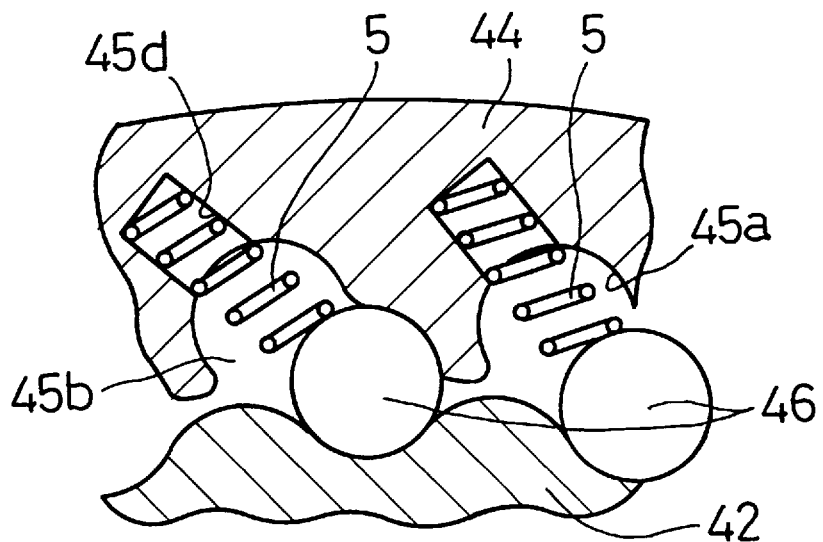
FIGS. 12A and 12B are enlarged cross-sectional views illustrating operation of a main portion of a speed reduction section according to a sixth embodiment.
Figure 12B:
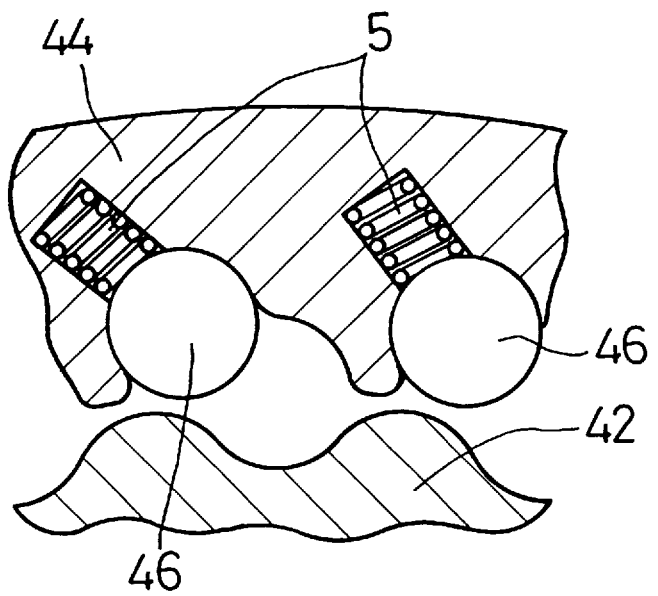

A speed reduction section 4 according to a sixth embodiment of the present invention is described with reference to FIGS. 12A and 12B.

In this embodiment, the garter spring 50 of the first embodiment is replaced with coil springs disposed in each one of the cavities 45. For this purpose, a cylindrical hole is formed in each one of the torque interrupting portions 45b to hold a part of the spring 5. The coil springs 5 bias the outer pins 46 against the torque transmitting portions 45b as shown in FIG. 12A.

(Seventh Embodiment)

Figure 13:
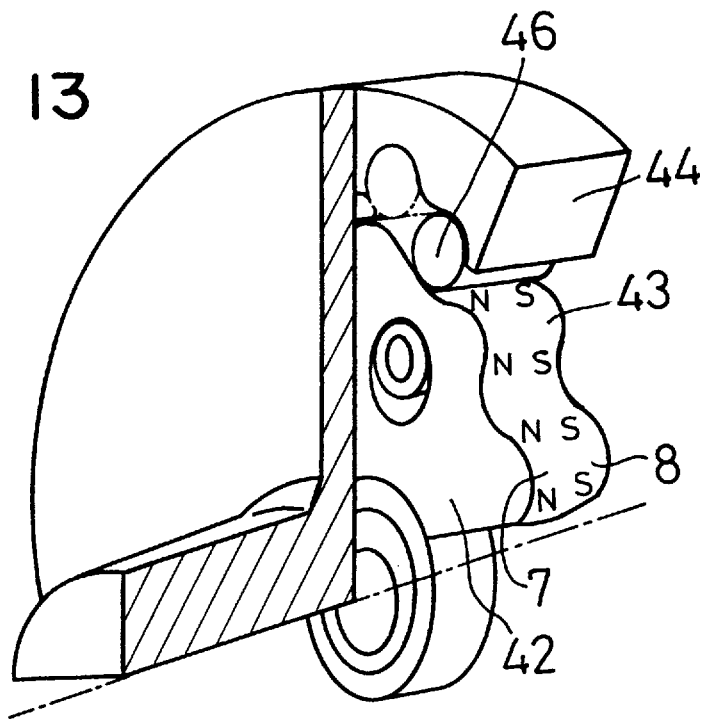
FIG. 13 is a perspective and partially cross-sectional view illustrating a main portion of a speed reduction section according to a seventh embodiment.

A speed reduction section according to a seventh embodiment of the present invention is described with reference to FIG. 13.

A plate member made of permanent magnet material is used for the inner gear plate 42 in this embodiment. The outer surfaces of the teeth 43 are magnetized in the axial direction to form N poles 7 and S poles 8 thereon. The outer pins 46 are made of soft magnetic member. Accordingly, the outer pins 46 are attracted by the teeth 43 and fitted to portions between the teeth 43 and normally engage the torque transmitting portions 45a. When the engine starts and rotates the outer ring, the outer pins 46 are operated in the same manner as the previous embodiments. That is, the centrifugal force applied to the outer pins 46 overwhelms the magnetic force of the teeth surfaces and get in the torque interrupting portions 45b when the engine speed becomes higher than a set speed. The outer ring 44 can be either magnetic or nonmagnetic.

This structure eliminates mechanical friction of the garter spring or coil springs.

(Eighth embodiment)

Figure 14:
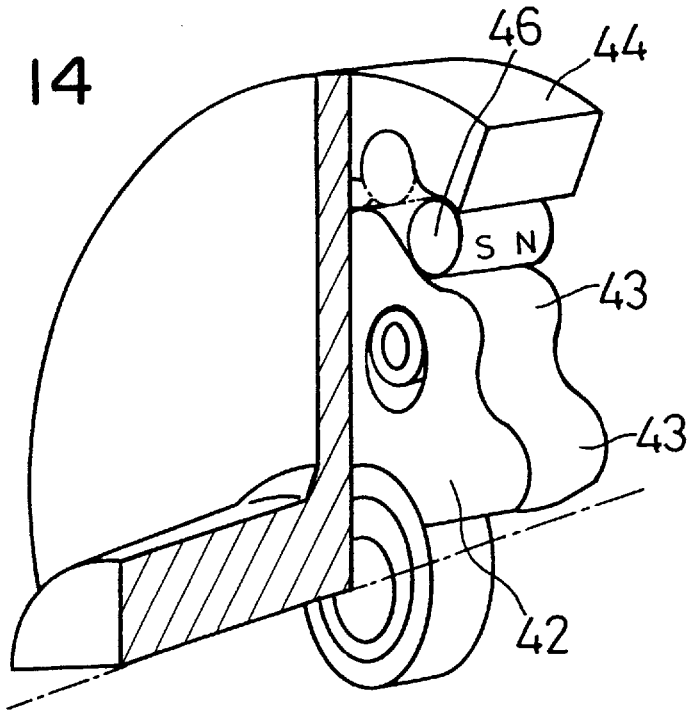
FIG. 14 is a perspective and partially cross-sectional view illustrating a main portion of a speed reduction section according to an eighth embodiment.

A speed reduction section according to an eighth embodiment is described with reference to FIG. 14.

The speed reduction section according to the eighth embodiment has outer pins 46 made of permanent magnet material. The outer pins 46 are magnetized in the axial direction. The inner gear plate 42 is made of soft magnetic material, and the outer ring 44 is made of nonmagnetic material. The operation of the outer pins are almost the same as the seventh embodiment.

(Ninth Embodiment)

Figure 15:
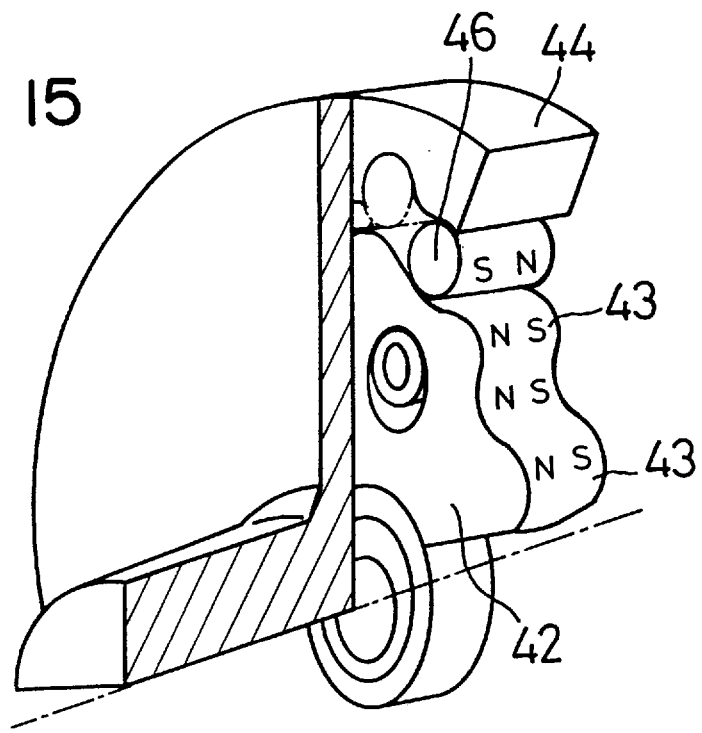
FIG. 15 is a perspective and partially cross-sectional view illustrating a main portion of a speed reduction section according to a ninth embodiment.

A speed reduction section according to a ninth embodiment is described with reference to FIG. 15.

The inner gear plate 42 and the outer pins 46 are made of permanent magnet material, and the teeth 43 are magnetized in a direction opposite to that of the outer pins 46 so that each one of the teeth 43 and corresponding one of the outer pins 46 are attracted more strongly than the corresponding members in the eighth embodiment. The outer ring 44 is made of nonmagnetic material. The operation of the outer pins are almost the same as the eighth embodiment.

(Tenth Embodiment)

A speed reduction section according to a tenth embodiment is described with reference to FIGS. 16 and 17.

Figure 16:
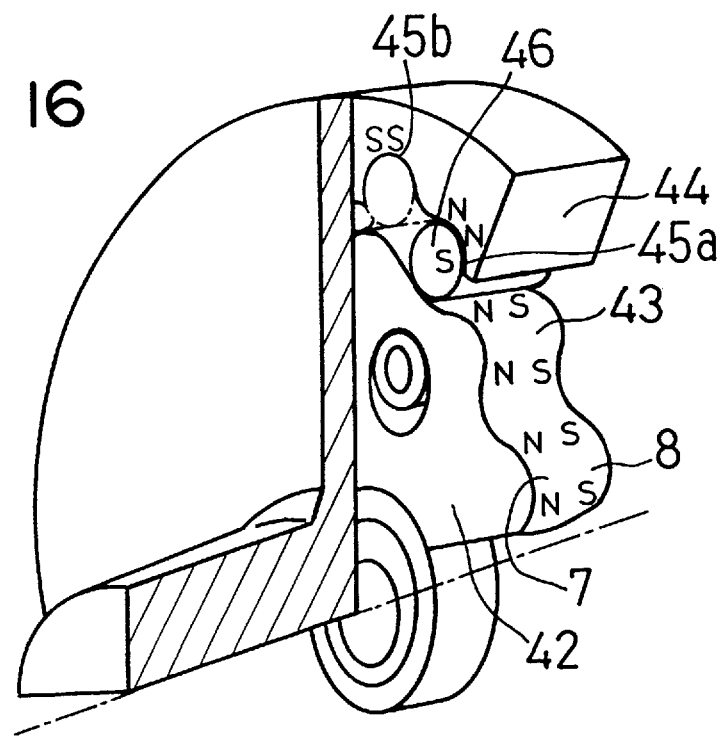
FIG. 16 is a perspective and partially cross-sectional view illustrating a main portion of a speed reduction section according to a tenth embodiment.
Figure 17:
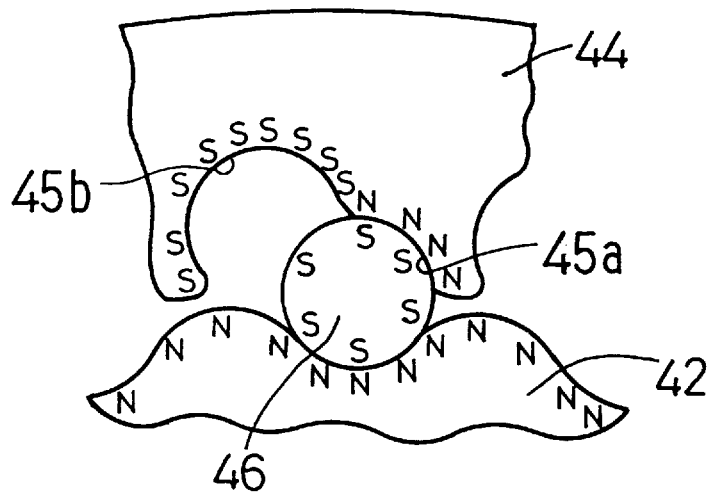
FIG. 17 is an enlarged view illustrating a main portion of a speed reduction section according to the tenth embodiment.

The outer pins 46, the inner gear plate 42 and the outer ring 44 are made of permanent magnet material and magnetized as shown in FIGS. 16 and 17. The torque transmitting portion 45a is magnetized in the direction opposite to the magnetized direction of the outer pins 46, and the torque interrupting portion 45b is magnetized in the direction same as the magnetized direction of the outer pins 46. Therefore, the torque transmitting portions 45a attract the outer pins 46 and the torque interrupting portions 45b repulse the outer pins 46.

(Eleventh Embodiment)

Figure 18:
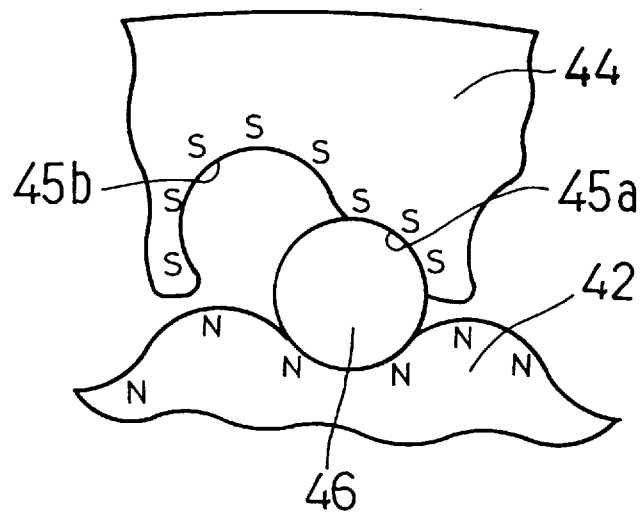
FIG. 18 is an enlarged view illustrating a main portion of a speed reduction section according to eleventh and twelfth embodiments.

A speed reduction section according to an eleventh embodiment is described with reference to FIG. 18.

The inner gear plate 42 and the outer ring 44 are made of permanent magnet material, and the outer pins are made of soft magnetic material. The outer ring 44 is magnetized in the axial direction to form S pole at one end, and the inner gear plate 42 is magnetized in the axial direction to form N pole at the same end as the outer ring 44 as shown in FIG. 18.

Therefore, the outer pin 46 bridges the S-pole of the torque transmitting portion 45a of the outer ring 44 and the N-pole of the teeth surface of the inner gear plate 42 so that the outer pin 46 can engage the torque transmitting portion 45a surely.

(Twelfth Embodiment)

A speed reduction section according to a twelfth embodiment is described with reference to FIG. 18.

The inner gear plate 42, outer ring 44 and outer pin 46 are made of soft magnetic material, which are magnetized by an outside magnetic field, such as a permanent magnet or a magnetic coil, to polarize the outer periphery of the inner gear plate to become S-pole and the inner periphery of the outer ring 44 to become N-pole. The field coil 111 and the generator shaft 12 can be utilized as a part of the outside magnetic field.

Thus, the S-pole of the outer ring and the N-pole of the inner gear plate are bridged by the outer pin 46, which can engages the torque transmitting portion 45a surely.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A speed reduction device having an overrunning clutch comprising:

a housing;

a drive shaft supported rotatably by said housing, said drive shaft having an eccentric ring disposed eccentrically therearound;

a driven shaft supported rotatably by said housing;

an inner gear plate disposed to be rotatable relative to said eccentric ring, said gear plate having a plurality of teeth on outer periphery thereof and an engagement hole;

a fixing pin, fixed to said housing in engagement with said engagement hole of said inner gear plate, for restricting rotation of said inner gear plate to thereby allow swinging of said gear plate;

an outer ring disposed around said inner gear plate and connected to said driven shaft, said outer ring having an inner surface; and a torque transmitting member, disposed on said inner surface to engage one of said teeth of said inner gear plate, for transmitting torque from said inner gear plate to said outer ring; wherein said torque transmitting member disengage said teeth of said inner gear plate by centrifugal force when said outer ring rotates at a speed higher than a threshold value.

2. A speed reduction device as claimed in claim 1, wherein said torque transmitting member is retracted to separate from said inner gear plate completely by centrifugal force when said outer ring rotates higher than a threshold value.

3. A speed reduction device as claimed in claim 1, wherein said torque transmitting member comprises an outer pin in engagement with said teeth of said inner gear plate in response to swinging operation thereof;

said outer ring has a torque transmitting portion for holding said torque transmitting member to be in engagement with one of said teeth of said inner gear plate and a torque interrupting portion for holding said torque transmitting member to be separate from said teeth of said inner gear plate.

4. A speed reduction device as claimed in claim 3 further comprising means for biasing said outer pin to one of said teeth of said inner gear plate.

5. A speed reduction device as claimed in claim 3, wherein said teeth has epitrochoidal-parallel-curved outer periphery.

6. A speed reduction device as claimed in claim 3, wherein said torque transmitting portion of said outer ring has a larger radius than outside radius of said outer pin.

7. A speed reduction device as claimed in claim 3, wherein said torque interrupting portion of said outer ring has a larger radius than outside radiaus of said outer pin.

8. A speed reduction device as claimed in claim 3, wherein said outer ring further comprises a boundary projecting portion 45c between said torque transmitting portion and said torque interrupting portion.

9. A speed reduction device as claimed in claim 3, wherein said boundary portion has a chamfer having a radius which is larger than a prescribed value.

10. A speed reduction device as claimed in claim 4, wherein said means for biasing comprises a garter spring.

11. A speed reduction device as claimed in claim 4, wherein said means for biasing comprises a coil spring.

12. A speed reduction device as claimed in claim 4, wherein said means for biasing comprises a magnetic member which magnetically biases said outer pin radially inward.

13. A speed reduction device as claimed in claim 12, wherein said outer pin comprises a soft magnetic member, and said means for biasing comprises a magnetic field generating means.

14. A speed reduction device as claimed in claim 12, wherein said outer pin comprises a magnetic member, and said means for biasing comprises a pole member disposed on outer periphery of said inner gear.

15. A speed reduction device as claimed in claim 3 further, comprising a cover fixed to said outer ring for covering said outer pin.

16. A speed reduction device as claimed in claim 1 further comprising a starter motor for starting an engine disposed in said housing, wherein said driving shaft is connected to said starter motor.

17. A speed reduction device as claimed in claim 16 further comprising a generator disposed in said housing, wherein said driven shaft is connected to said generator.

18. A speed reduction device as claimed in claim 16, wherein said outer pin disengages from said torque transmitting portion when rotation speed of said outer ring is higher than rotation speed thereof at starting of said engine and lower than rotation speed thereof at idling of said engine.

19. A speed reduction device as claimed in claim 18, wherein said outer pin separates from said inner gear plate completely when rotation speed of said outer ring is higher than a prescribed speed between rotation speed of said outer ring at starting of said engine and rotation speed thereof at idling of said engine.

20. A speed reduction device having an overrunning clutch comprising:

a housing;

a drive shaft supported rotatably by said housing, said drive shaft having an eccentric ring disposed eccentrically therearound;

a diriven shaft supported rotatably by said housing;

an inner gear plate disposed to be rotatable relative to said eccentric ring, said gear plate having a plurality of teeth therearound and a plurality of engagement holes;

a plurallity of fixing pins, each of which is fixed to said housing in engagement with one of said engagement holes of said inner gear plate, for restricting rotation of said inner gear plate to thereby allow swinging of said gear plate;

an outer ring disposed around said inner gear plate and conneted to said driven shaft, said outer ring having an inner surface; and a torque transmitting member, disposed on said inner surface to engage said teeth of said inner gear plate, for transmitting torque from said inner gear plate to said outer ring; wherein said torque transmitting member is disengaged from said teeth of said inner gear plate by centrifugal force when said outer ring rotates at a speed higher than a threshold value.

21. A speed reduction device having an overrunning clutch comprising:

a housing;

a drive shaft supported rotatably by said housing, said drive shaft having a pair of eccentric rings axially disposed eccentrically therearound;

a diriven shaft supported rotatably by said housing;

a pair of inner gear plates disposed respectively to be rotatable relative to said eccentric ring, each of said inner gear plates having a plurality of teeth therearound and a plurality of engagement holes, each one of said teeth of one of said inner gear plates being disposed between adjacent teeth of the other inner gear plate;

a plurality of fixing pins, fixed to said housing in engagement with said engagement holes of said inner gear plates respectively, for restricting rotation of said inner gear plates to thereby allow swinging of said gear plates;

an outer ring disposed around said inner gear plates and conneted to said driven shaft, said outer ring having an inner surface; and a torque transmitting member, disposed on said inner surface of said outer ring to engage said teeth of said inner gear plates, for transmitting torque from said inner gear plates to said outer ring; wherein said torque transmitting member is disengaged from said teeth of said inner gear plates by centrifugal force when said outer ring rotates at a speed higher than a threshold value.

* * * * *